July 9, 1963 A. SEIREG ET AL 3,096,631

COUPLING

Filed July 24, 1961 2 Sheets-Sheet 1

INVENTORS
ALI SEIREG
EDWARD J. WELLAUER

BY Adrian L. Bateman, Jr.

ATTORNEY

July 9, 1963 A. SEIREG ET AL 3,096,631
COUPLING
Filed July 24, 1961 2 Sheets-Sheet 2
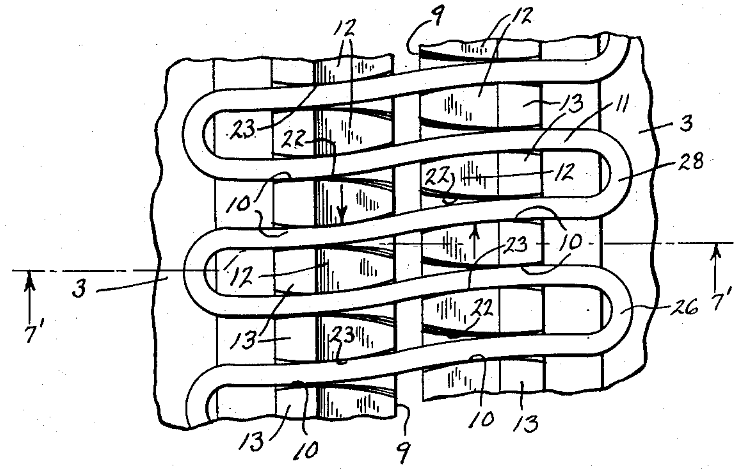
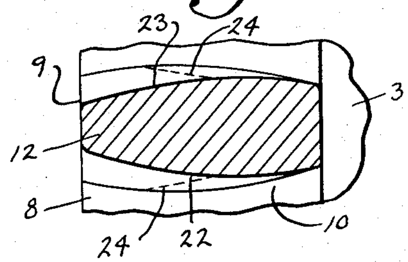
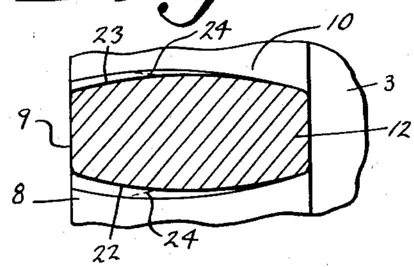
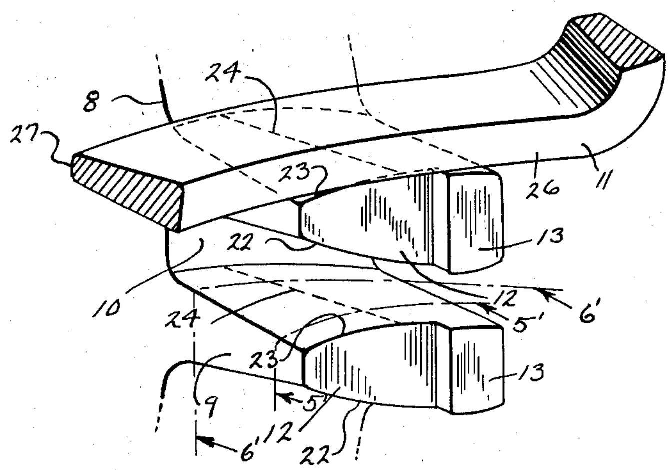
INVENTORS
ALI SEIREG
EDWARD J. WELLAUER
BY Adrian L. Bateman, Jr.
ATTORNEY United States Patent Office 3,096,631

Patented July 9, 1963

1

3,096,631

COUPLING

Ali Seireg, Whitefish Bay, and Edward J. Wellauer, Wauwatosa, Wis., assignors to The Falk Corporation, Milwaukee, Wis., a corporation of Wisconsin Filed July 24, 1961, Ser. No. 126,209

7 Claims. (Cl. 64—15)

This invention relates to flexible couplings of the type in which coupling hub members affixed to adjacent ends of the shafts to be coupled are provided with axially directed peripheral teeth which define slots adapted to receive resilient interconnecting grid members, and particularly resides in a coupling of such type in which the grid supporting teeth are provided with axially inclined curved side walls whereby the teeth present inclined supports for the grid members under all conditions of load.

Flexible couplings which employ resilient, relatively stiff torque transmitting grid members generally provide the grid supporting teeth with axially curved side walls, the axes of revolution of which lie in a plane which is perpendicular to the axes of the coupled shafts. As is well known in the art, providing such curved side walls results in a uniform unsupported length of the grid member which varies as the coupling load varies. Thus, as the relative angular displacement of the interconnected hub members increases under increasing coupling load, the limit of contact of the grid member with the associated teeth moves inwardly thereby resulting in the least unsupported length under the maximum coupling load.

A problem encountered in the use of such couplings is the fact that the stress is distributed non-uniformly over the radial width of the grid member. This results in an inefficient use of the coupling material.

Such non-uniform stress distribution is caused in part by the difference in circumferential displacement, or deflection, of the fibers along the radial width of the grid member under load. Thus, the fibers located at the radially outer surfaces of the grid members are circumferentially displaced a greater amount than the fibers located at the radially inner surfaces thereof, due to the difference in the radial positions of the fibers. When a grid member of tapered cross section such as shown and described in the copending application of our co-worker, Walter P. Schmitter, for "Coupling," Serial No. 105,529, filed April 20, 1961, is employed as the resilient torque transmitting means, a further non-uniformity is caused by the varying thickness of the grid, which thickness is greatest at the fibers located at the radially outer surface thereof.

The total load on a grid member will be distributed to each fiber in direct proportion to the amount of circumferential displacement of that fiber and also in direct proportion to the third power of the thickness of the grid at the location of the fiber. Therefore, the amount of load distributed to the radially outer fibers is disproportionately greater than the amount distributed to the fibers at the inner surface, since at the outer surface both the circumferential displacement and the thickness is the greatest. The stress to which each fiber will be subjected is directly proportional to the load on that fiber and inversely proportional to the second power of the thickness of the grid member at that fiber. The net result of the foregoing relationships is that the stress at the outer surface is far in excess of the average stress on the cross section of the grid member and this results in an inefficient use of material.

The coupling of the present invention effectively reduces the maximum grid member stresses and thereby

2 increases the coupling strength or capacity. This is accomplished by providing the side walls of the coupling teeth with a compound curvature so that the side walls will furnish inclined supports for the interconnecting grid members under all conditions of load, thereby resulting in a uniform distribution of stress along the cross section of the grid member and a reduction in the stress along the length of the grid member.

The inclined supports for the grid member provided by the present coupling result in a greater unsupported length for the fibers of the grid member at the radially outer surface than for the fibers at the radially inner surface for all coupling loads. Since the load on each fiber will be inversely proportional to the third power of one-half of the unsupported length of the fiber, the difference in the unsupported lengths of the fibers along the radial width of the grid member will offset the effect of the differences in circumferential displacement and grid thickness. This results in a uniform distribution of stress along the cross section of the grid member and particularly at the critical section or limit of contact between the grid member and teeth. The uniform distribution reduces the maximum stress along the grid member cross section.

In addition, the average unsupported length of the entire grid member is reduced from that which would occur in previous couplings, thereby resulting in a reduction of the maximum stress along the length of the grid member.

The combined effect of the above reductions in the maximum stress produces greatly improved coupling strength and full utilization of the capabilities of the coupling material.

It is, therefore, an object of this invention to provide a flexible coupling having improved strength and efficient utilization of the grid member and hub material under all loads.

It is a further object of this invention to provide a flexible coupling having tapered coupling teeth whereby inclined supports are provided for the interconnecting grid members under all conditions of load.

It is another object of this invention to provide a flexible coupling wherein the coupling teeth have tapered compound curved side walls which result in a reduction of the maximum stress along the cross section of the grid member and a reduction in the maximum stress along the length of the grid member.

The foregoing and other objects and advantages of the coupling of this invention will appear in the following description. In the description reference is made to the accompanying drawings which form a part hereof and in which there is shown by way of illustration, and not of limitation, a specific embodiment of the coupling.

In the drawings:

FIG. 3 is a plan view of a portion of the coupling hub members and interconnecting grid member under load;

FIG. 4 is a view in perspective of the tapered coupling teeth with a portion of a grid member shown therein;

FIG. 5 is a view in section taken along the plane of line 5′—5′ of FIG. 4;

FIG. 6 is a view in section taken along the plane of line 6′—6′ of FIG. 4; and

Figure 1:
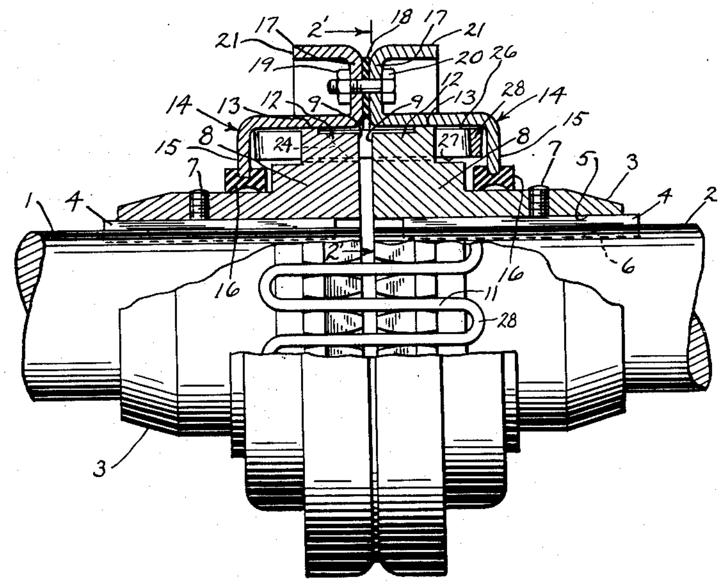
FIG. 1 is a view in elevation partly in section of a coupling in accordance with the teachings of this invention.

Referring now to the drawings, and specifically to

FIG. 1, there is shown therein a flexible shaft coupling connecting a driving shaft 1 and a driven shaft 2. The coupling includes two similar hub members 3 adapted to be connected in facing relation to the shafts 1 and 2. The hub members 3 are secured to the shafts 1 and 2 for rotation therewith by keys 4 which are received in cooperating keyways 5 provided in the hub members 3 and keyways 6 provided in the shafts 1 and 2. The hub members 3 are restrained from axial movement relative to the keys 4 by set screws 7.

Each hub member 3 includes a flange portion 8 disposed peripherally about that portion of the hub adapted to be placed in facing relation with the adjacent hub. The interior surface of the flange portion 8 lies in a plane common to the end of its respective hub member 3 to thereby define an inner face 9 of the hub member 3.

The flange portions 8 are provided with a series of radially spaced, axially directed slots 10 which are adapted to receive an interconnecting grid member. While various types of grid members may be employed, a serpentine tapered grid member having rungs 11 connected by integral end loops 28 is shown in the drawings for purposes of illustration. The slots 10 define a series of peripherally spaced, axially aligned coupling teeth 12. The teeth 12 include raised cover supporting surfaces 13 which act as extensions of the flange portions 8.

A suitable coupling cover is provided to prevent the entry of dust and grit to the working portions of the coupling, and also to act as a lubricant retainer housing for the coupling. The cover comprises two similar coupling cover members designated generally by the numeral 14. Each cover member 14 includes a radially bent, inwardly directed portion 15 which is seated in a suitable resilient ring 16 disposed peripherally about the hub members 3. The sealing rings 16 are preferably formed of resilient material which is resistant to deterioration in the presence of lubricants. The cover members 14 also include radially bent, outwardly directed portions 17 which are adapted to be placed in facing relation separated by a gasket 18. The cover members 14 are secured together by cooperating nuts 19 and bolts 20 received in suitable holes provided about the periphery of the bent portion 17 and the gasket 18. The cover members 14 terminate in axially directed bent portions 21 which cooperate to form a protective shield for the bolts 20 and nuts 19. As thus described, the cover members 14 are supported upon the hub members 3 by being seated in the resilient sealing rings 16 and by resting upon the cover supporting surfaces 13 of the teeth 12.

The coupling teeth 12 have side walls 22 and 23 which are provided with curved surfaces. The surfaces of the side walls 22 and 23 are generated about axes of revolution which are inclined relative to the axes of the shafts 1 and 2. The axes of revolution for the side walls 22 of each hub member 3 are inclined in the same direction and such axes of revolution tend to converge toward a plane which includes the respective inner face 9 of the hub member 3. Similarly, the axes of revolution of the side walls 23 of each hub member 3 tend to converge toward a plane including its inner face 9.

The nature of the curvature provided to the side walls 22 and 23 will be more clearly understood by reference to FIG. 4. The side walls 22 and 23 are each provided with an inclined cylindrical surface which is described by a generatrix which may be represented in one position by a dotted line 24. Such generatrix 24 will slope toward the inner face 9 of the hub member 3. Since in the embodiment being described a tapered grid member is utilized, the slots 10 will of necessity be provided with a similar taper. Thus, the combination of the tapered slots 10 and inclined axes of revolution of the walls 22 and 23 result in coupling teeth 12 as shown in the drawings.

It will be noted from reference to FIGS. 4–6, that the side walls 22 and 23 are curved both axially and radially relative to the hub member 3. The only straight lines which exist on the surfaces of the side walls 22 and 23 are parallel to the generatrix 24. Thus, the walls 22 and 23 have compound curved surfaces relative to the axial and radial directions.

When the coupling of this invention is subjected to a load, the grid rungs 11 will contact the side walls 22 or 23 depending upon the direction of the relative angular displacement of the hub members 3. The limit of contact between the grid rungs 11 and the teeth 12 will be parallel to the generatrix 24 and its position will be dependent upon the amount of load on the coupling, as will hereinafter be described.

The non-uniform distribution of stress along the radial width of the grid member found in previous couplings, and noted above, results from differences in circumferential displacement of the fibers of the grid member under load and also, in the case of tapered grid members, from the varying thickness of the grid member. Under load, the hub members 3 will be displaced angularly relative to each other. If it is assumed that the longitudinal center of the grid member remains stationary under load, the hub members can then be said to be angularly displaced in opposite directions about the center of the grid member and the grid runs 11 will be displaced together with the hub members 3 to assume a position relative to their normal, or unloaded, position which is represented in exaggerated form in FIG. 2 by the dotted line 25. Only one rung 11 of the grid member is shown displaced but it is to be understood that the remaining rungs 11 of the grid member will be similarly displaced. Under load and for the condition of bending without twist wherein the angular displacement of each fiber of the grid rung 11 is the same in a radial plane, it will be apparent that the fibers at the radially outer surface 26 of the grid rung 11 will be displaced, or deflected, a greater circumferential distance than the fibers at the radially inner surface 27. Since, for a tapered grid member, the total load on the grid rung 11 is distributed to each fiber in direct proportion to the circumferential displacement and to the third power of the thickness of the grid member at the location of the fiber, the fibers at the outer surface 26 will receive a greater load than the fibers at the radially inner surface 27. In previous couplings, the straight radial supports furnished by the teeth to the grid member resulted in a uniform unsupported length for each fiber at any load. Thus, the stress on the fibers at the outer surface 26 greatly exceeded the stress on the fibers at the inner surface 27, thereby producing a non-uniform distribution of stress. The same result followed from the use of a rectangular grid member although the detrimental effect of varying grid member thickness was not present.

The coupling of this invention eliminates the undesirable non-uniform stress distribution by providing full inclined supports for the grid rungs 11 under all conditions of load within the coupling capacity. As noted above, the limit of contact between the grid rungs 11 and coupling teeth 12 is inclined and parallel to the generatrix 24. Furthermore, as the relative angular displacement of the hub members increases under increasing coupling loads, the limit of contact advances toward the inner faces 9 of the hub members 3. Thus, under all conditions of load, the fibers of the grid rungs 11 are provided with different unsupported lengths, with the greatest length at the outer surface 26.

The grid member load distributed to each fiber is inversely proportional to the third power of one-half of the unsupported length of the fiber. Thus, the varying unsupported length offsets the effect of differences in circumferential displacement and grid member thickness since those fibers subjected to the largest displacement at the greatest thickness also have the largest unsupported length. This results in a uniform distribution of stress along the cross section and particularly at the critical section along the inclined support.

In addition, the maximum stress along the length of the grid rung 11 is reduced. This results from a reduction in the average unsupported length of each grid rung 11. In previous couplings employing straight radial supports, the unsupported length for all fibers at a certain load would be the same as the unsupported length of the fibers at the outer surface 26 of the present coupling. All other fibers of the grid rung 11 have a smaller unsupported length thereby resulting in a smaller average unsupported length for the present coupling. A reduction in the average unsupported length reduces the moment placed on the grid rung 11 thereby decreasing the stress.

The combination of reduction of maximum stresses along the radial width and along the length of the grid rungs 11 results in considerable reduction in the stress applied to the grid member with an attendant large increase in the capacity of the coupling.

While the improvement in the capacity of the coupling is greatest when a tapered grid member is employed therein, the stress distribution on a rectangular grid member will also be made substantially uniform. However, when a rectangular grid member is utilized, the difference in the unsupported length of the fibers is required to offset only the difference in circumferential displacement of the fibers since the thickness is constant. Furthermore, reduction in the maximum stress along the length of a rectangular grid member will be achieved with the coupling of this invention.

A further increase in coupling capacity results from an increase in the strength of the coupling teeth 12. Since the limit of contact between each grid rung 11 and tooth 12 advances toward the inner face 9 of the respective hub 3 as the coupling load increases, the portion of the root of the tooth 12 adjacent the inner face 9 is subjected to the maximum intensity of bending moment. In previous couplings the maximum root thickness occurred towards the outer face of the hub where the intensity of the bending moment is the least. However, as will be apparent from FIGS. 4–6, the root thickness of the teeth 12 is greatest adjacent the inner face 9 of the hub 3 where the intensity of the bending moment is greatest thereby resulting in considerable improvement in the tooth strength. This improvement in coupling capacity will be present in the coupling of this invention regardless of the type or form of grid member employed.

The cross-sectional configuration of the grid member used will dictate the degree of slope to be provided to the generatrix 24 of each tooth 12. The inclination of the generatrix 24 which should be provided for uniform distribution of stress along the radial width of each grid rung 11 may be determined from the following relationship:

$$\frac{a_x}{a_0}=\frac{1}{2}\left[\frac{3L}{2a_0}-\sqrt{\left(\frac{3L}{2a_0}\right)^2-4\left(\frac{3L}{2a_0}-1\right)\frac{R_x t_x}{R_0 t_0}}\right]$$

Figure 2:
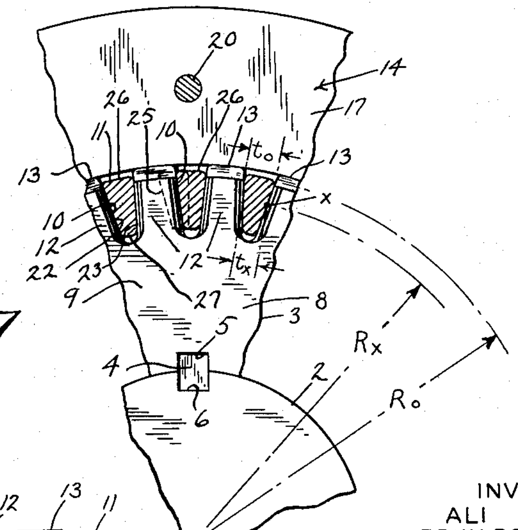
FIG. 2 is a partial view in elevation and section taken along the plane of line 2′—2′ of FIG. 1.
Figure 7:
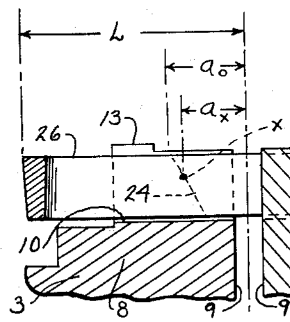
FIG. 7 is a view in section taken along the plane of line 7′—7′ of FIG. 3.

Assuming that the line of contact between the grid rung 11 and tooth 12 coincides with the position of the generatrix 24 as shown in FIG. 7, $a_x$ is one-half of the unsupported span of a fiber $x$ of the grid rung 11 along such line of contact located at a radial distance $R_x$ from the coupling axis (see FIG. 2), $a_0$ is one-half of the unsupported span of a fiber at the outer surface 26 of the grid rung 11 along such line of contact and located at a radial distance $R_0$ from the coupling axis, and L is one-half of the total length of an element of the grid member measured from end loop to end loop. Therefore, $a_x$, $a_0$ and L may be taken from the center line of the coupling gap defined by the inner faces 9 of the hubs 3, as shown in FIG. 7. Referring to FIG. 2, $t_x$ is the thickness of the grid rung 11 at the location of the fiber $x$, and $t_0$ is the thickness of the grid rung 11 at the outer surface 26. It will be noted that $t_x$ and $t_0$ are dependent upon the cross-sectional configuration of the grid member utilized. The above relationship assumes a line contact between the grid rungs 11 and teeth 12 and experimentation has shown this assumption to be valid. The above relationship would result in a non-linear generatrix. However, for ease in forming the teeth 12, a straight line generatrix 24 may be utilized which approximates closely the theoretical curved generatrix.

The degree of inclination of the generatrix 24 measured from a radial plane normal to the axis of the respective hub member 3 should be less when a rectangular grid member is utilized than when a tapered grid member is used. Similarly, the degree of inclination of the generatrix 24 should increase as grid members of increasing tapered cross section are employed in the coupling. For example, to achieve uniform stress distribution in a normal coupling which utilizes a 12° tapered grid, the angle which the generatrix 24 makes with a radial plane normal to the hub axis should lie between 45° and 50°.

The results above described may be obtained with various types of grid members. Thus, the increase in coupling capacity will result with single or multiple grid members and with continuous or single section beam members.

The material from which the grid members are formed may be metal or other substances which are capable of providing resiliency with relative axial stiffness. Substances which are soft, flexible or excessively brittle are not suitable.

It will be appreciated from the above description that the coupling of the present invention effectively increases the coupling capacity by reducing the stress along the radial width and along the length of the grid member, and that such improvement in capacity is obtained for all conditions of coupling load.

We claim:

1. A coupling for connecting driving and driven shafts comprising a pair of hub members connectable to said shafts for rotation therewith and having interior surfaces in facing relationship, each of said hub members including a plurality of axially extending and peripherally spaced teeth which define slots therebetween, said teeth having side walls which are curved with the axes of revolution thereof tending to converge toward a plane which includes said interior surface of the respective hub member; and a grid member received within said slots to form a resilient torque transmitting element between said hubs.

2. A coupling for connecting driving and driven shafts comprising a pair of hub members connectable to said shafts for rotation therewith and having interior surfaces in facing relationship, each of said hubs including a plurality of axially extending and peripherally spaced teeth which define slots therebetween, each of said teeth having first and second side walls, the first side walls of the teeth of each hub member being curved with the axes of revolution thereof tending to converge toward a plane which includes said interior surface of the hub member and the second side walls of the teeth of each hub member being curved with the axes of revolution thereof tending to converge toward a plane which includes said interior surface of the hub member; and a grid member received within said slots to form a resilient torque transmitting element between said hub members.

3. A coupling for connecting driving and driven power transmission shafts comprising a pair of hub members adapted for attachment to said shafts for rotation therewith and having interior surfaces in facing relationship, each of said hubs having a plurality of axially extending and peripherally spaced teeth which have curved side walls generated by a line which slopes toward said interior surface of the hub member; and a grid member received between adjacent side walls of said teeth to form a resilient torque transmitting element between said hub members.

4. A resilient coupling for connecting driving and driven shafts comprising a pair of hub members connectable to said shafts for rotation therewith, each of said hub members including a plurality of axially extending and peripherally spaced teeth which define slots therebetween, the teeth of each hub member having cylindrical side walls inclined in an axial direction toward the center of the other hub member; and a grid member received in said slots, said side walls providing inclined support to said grid member under all conditions of coupling load.

5. A coupling for connecting driving and driven shafts comprising a pair of hubs connectable to said shafts for rotation therewith, each of said hubs including a plurality of axially extending and peripherally spaced teeth which have axially and radially curved side walls; and a resilient torque transmitting grid member received between adjacent side walls of said teeth whereby the distribution of stress on the cross section of said grid member is uniform under all conditions of coupling load.

6. A coupling for connecting driving and driven shafts comprising a pair of hubs connectable to said shafts for rotation therewith, each of said hubs including a plurality of axially extending and peripherally spaced teeth which have axially and radially curved side walls; and a resilient torque transmitting grid member received between adjacent side walls of said teeth whereby the average unsupported length of said grid member is less than the unsupported length at its radially outer surface.

7. A coupling for connecting driving and driven shafts comprising a pair of hub members connectable to said driving and driven shafts for rotation therewith and having interior surfaces in facing relationship, each of said hub members including a plurality of axially extending teeth having their adjacent side walls defining slots therebetween, each of said side walls of the teeth of each hub member being curved with its axis of revolution inclined relative to the axes of the driving and driven shafts toward the center of the other hub member; and a grid member received in said slots to form a resilient torque transmitting element between said shafts.

References Cited in the file of this patent

UNITED STATES PATENTS

| | | |
|---|---|---|
| 1,953,211 | Benedek | Apr. 3, 1934 |
| 2,027,842 | Schmitter et al. | Jan. 14, 1936 |